US006378879B2

(12) United States Patent
Rappaport

(10) Patent No.: US 6,378,879 B2
(45) Date of Patent: *Apr. 30, 2002

(54) DUAL FOOTBOARD OFF-ROAD SCOOTER

(76) Inventor: Mark Rappaport, 5955 Mira Mesa Blvd., Suite #F, San Diego, CA (US) 92121

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/075,746

(22) Filed: May 11, 1998

Related U.S. Application Data

(63) Continuation-in-part of application No. 08/593,437, filed on Jan. 29, 1996, now Pat. No. 5,785,331.

(51) Int. Cl.⁷ .............................................. B62M 1/00
(52) U.S. Cl. .................................................. 280/87.041
(58) Field of Search ..................... 280/87.01, 87.021, 280/87.03, 87.041, 87.042, 11.2, 14.3, 12.1, 7.12, 7.13, 7.14; 301/5.3; 441/65, 68, 72, 79

(56) References Cited

U.S. PATENT DOCUMENTS

| 1,472,375 A | * 10/1923 | Stuart et al. | 280/87.021 |
| 1,516,105 A | * 11/1924 | Kinoshita | 280/87.041 |
| 2,077,274 A | * 4/1937 | Silkman | 280/87.041 |
| 2,597,748 A | * 5/1952 | Powell | 280/87.041 |
| 4,087,104 A | * 5/1978 | Winchell et al. | 280/12.1 |
| 4,087,106 A | * 5/1978 | Winchell et al. | 280/12.1 |
| 4,143,728 A | * 3/1979 | Shiber | 280/87.042 |
| D291,211 S |   8/1987 | Man | D21/80 |
| 4,776,604 A | * 10/1988 | Valdez et al. | 280/87.041 |
| 5,039,121 A | * 8/1991 | Holter | 280/87.041 |
| 5,048,632 A | * 9/1991 | Battel | 280/87.042 |
| 5,346,231 A | * 9/1994 | Ho | 280/11.2 |
| 5,620,189 A | * 4/1997 | Hinderhofer | 280/87.041 |
| 5,645,291 A | * 7/1997 | Ramage | 280/87.042 |

FOREIGN PATENT DOCUMENTS

| GB | 3277 | * of 1909 | 280/87.041 |
| SE | 126364 | * 10/1949 | 280/87.041 |

OTHER PUBLICATIONS

New Ride on Demo Tape; Jun. 3, 1993.

* cited by examiner

Primary Examiner—Frank Vanaman

(57) ABSTRACT

A dual-footboard scooter in a tricycle format for off-road use on unpaved surfaces, the scooter having a front wheel of large diameter coupled to a steering post passing through a steering column to join a steering handle. A bifurcated frame extending rearwardly from the steering column forms two branches on which are supported parallel footboards and small diameter rear wheels. The front and rear wheels are provided with deep-tread tires affording good traction on unpaved surfaces. In operating the scooter, the rider grasps the steering handle, with one foot then resting on either footboard and the other foot extending through the free space between the footboards and swinging to make pushing contact with the ground to propel the scooter.

7 Claims, 3 Drawing Sheets

DUAL FOOTBOARD OFF-ROAD SCOOTER

RELATED APPLICATION

This application is a continuation-in-part of application Ser. No. 08/593,437, filed Jan. 29, 1996, now U.S. Pat. No. 5,785,331, entitled "Dual-Footboard Scooter," the entire disclosure of which is incorporated herein by reference.

BACKGROUND OF INVENTION

1. Field of Invention

This invention relates generally to foot-propelled scooters, and more particularly to a dual-footboard scooter in a tricycle format for off-road use.

2. Status of Prior Art

A standard scooter is a child's vehicle which includes a long footboard supported by front and rear end wheels. The scooter is controlled by an upright steering post coupled to the front wheel and provided with a steering handle. In riding the scooter, the child grasps the handle and rests one foot on the footboard. The child puts the scooter in motion by means of his other foot which is swung to repeatedly make pushing contact with the road on one side of the footboard.

A single footboard scooter is a somewhat hazardous vehicle in the hands of an inexperienced child, for like a two-wheel bicycle, the scooter is inherently unstable. Unless the scooter is in motion and the child balances his weight on the footboard, the scooter will tip to one side and throw the rider. Or should the scooter jump in the course of travel and the front wheel becomes raised above the ground, the scooter may then swing backward about the rear wheel and throw the rider.

Far more stable and controllable than a scooter is a conventional tricycle which has a front wheel to which a steering handle is coupled through a steering post, and a pair of rear wheels above which is a seat to accommodate the child. The feet of the seated child engages pedals mounted on the axle of the front wheel.

But a tricycle is a relatively tame vehicle, for its pedal operation does not permit the tricycle to go very fast. The advantage of a scooter is that it can not only be propelled to travel at high speed, but one can also execute various maneuvers with a scooter, such as jumping over steps to go from a raised to a lower road surface. However, with a conventional single footboard scooter, risks are entailed in executing daring tricks.

Inasmuch as a scooter in accordance with the invention is in a tricycle format, of prior art interest is the Powell U.S. Pat. No. 2,597,748. The walking and riding vehicle of Powell is provided with a V-shaped tubular metal frame on whose diverging legs are mounted rear end wheels. A front wheel controlled by a steering handle is supported below the apex of the frame. The child grasping the handle can walk the Powell vehicle by walking between the legs, or the vehicle can be used for coasting by standing on foot rest plates attached to the diverging legs.

The tri-skater shown in the Holter U.S. Pat. No. 5,039,121 has a V-shaped frame on which footboards are mounted, rear skate casters being coupled to the rear of the footboards. A handle-controlled front wheel is coupled to the apex of the frame. The Holter vehicle is propelled by a rider who grasps the handle and stands on the footboards, the rider shifting his weight alternately from side to side as if he were ice skating.

The three-wheeled scooter type vehicle disclosed in the Shelton U.S. Pat. No. 4,540,192 is forwardly propelled by body movement of the rider by means of two rearwardly extending foot support frames pivotally connected to a front steering column. The foot support frames are provided with caster wheels which are yieldably tensioned to propel the vehicle in a direction of forward travel when the foot support frames are laterally moved.

Disclosed in the Winchell U.S. Pat. Nos. 4,071,261, 4,076,270 and 4,088,338, in the Biskup U.S. Pat. No. 4,165,093 and in the Williams U.S. Pat. No. 4,047,732 are three-wheeled cambering vehicles. In these cambering vehicles, foot rests are provided in a V-formation, the vehicle being propelled by the rider shifting his weight in a timed sequence from one foot to the other.

In my above-identified copending application there is disclosed a dual-footboard scooter in a tricycle format, the front wheel of the scooter being mounted under a steering post passing through a steering column to join a steering handle provided with a hand brake operatively coupled to the front wheel. A pair of parallel footboards are attached at their front ends to a bifurcated frame extending rearwardly from the steering column. Secured to the underside of each footboard is a rear end wheel, behind which is a skid brake adapted to engage the ground only when the footboard is upwardly tilted.

The bifurcated frame defines separate branches to which the parallel footboards are attached, the branches having a free space therebetween which merges with the free space between the parallel footboards. This provides an extended free space, so that regardless of where a rider stands with one foot on either footboard, he has available an extended free space between the footboards in which to swing his other foot to propel the scooter.

In operating the scooter, the rider grasps the steering handle, one foot then resting on either one of the footboards, the other foot extending through the free space between the footboards to make pushing contact with the ground to propel the scooter forward. Should the scooter jump in the course of travel and in doing so raise the front wheel above ground and cause the footboards to become upwardly inclined, the scooter then seeks to swing backward about the rear wheels and thereby endanger the rider. This action is avoided by the rear skid brakes which then engage the ground to cause the scooter to swing forward to return the front wheel to the ground.

A scooter of the type disclosed in my copending application is best suited for use on smooth paved roads free of ruts and other surface disruptions. It is also suitable for use on sidewalks, in school yards and in parks having paved paths. But this dual-footboard scooter is not well adapted for off-road operations. That is to say, it does not ride well on dirt paths unpaved roads having a rough surface or grassy ground.

SUMMARY OF INVENTION

In view of the foregoing, the main object of this invention is to provide a dual-footboard scooter adopted for off road use in a tricycle format which is propelled by a rider who rests one foot on either footboard while swinging the other foot in the space between the footboards to make pushing contact with the ground.

Among the significant features of a dual-footboard off-road scooter in accordance with the invention are the following:

A. the scooter has the inherent stability of a tricycle, yet is more maneuverable and is capable of being propelled to travel at a much faster speed;

B. the scooter is safe to operate under off-road conditions, for the wheels of the scooter are provided with deep-tread tires which provide good traction on a dirt path or an unpaved road; and C. the scooter is of simple design and can therefore be mass produced at low cost, using for this purpose standard tricycle components.

Briefly stated, these objects are attained by a dual-footboard scooter in a tricycle format for off-road use having a front wheel of large diameter coupled to a steering post passing through a steering column to join a steering handle. A bifurcated frame extending rearwardly from the steering column forms two branches on which are supported parallel footboards and small diameter rear wheels.

The front and rear wheels are provided with deep-tread tires affording good traction on unpaved surfaces. In operating the scooter, the rider grasps the steering handle, with one foot then resting on either footboard and the other foot extending through the free space between the footboards and swinging to make pushing contact with the ground to propel the scooter.

BRIEF DESCRIPTION OF DRAWING

For a better understanding of the invention as well as other objects and further features thereof, reference is made to the following detailed description to be read in conjunction with the accompanying drawings, wherein.

DESCRIPTION OF INVENTION

Road Use Scooter Structure

Figure 1:
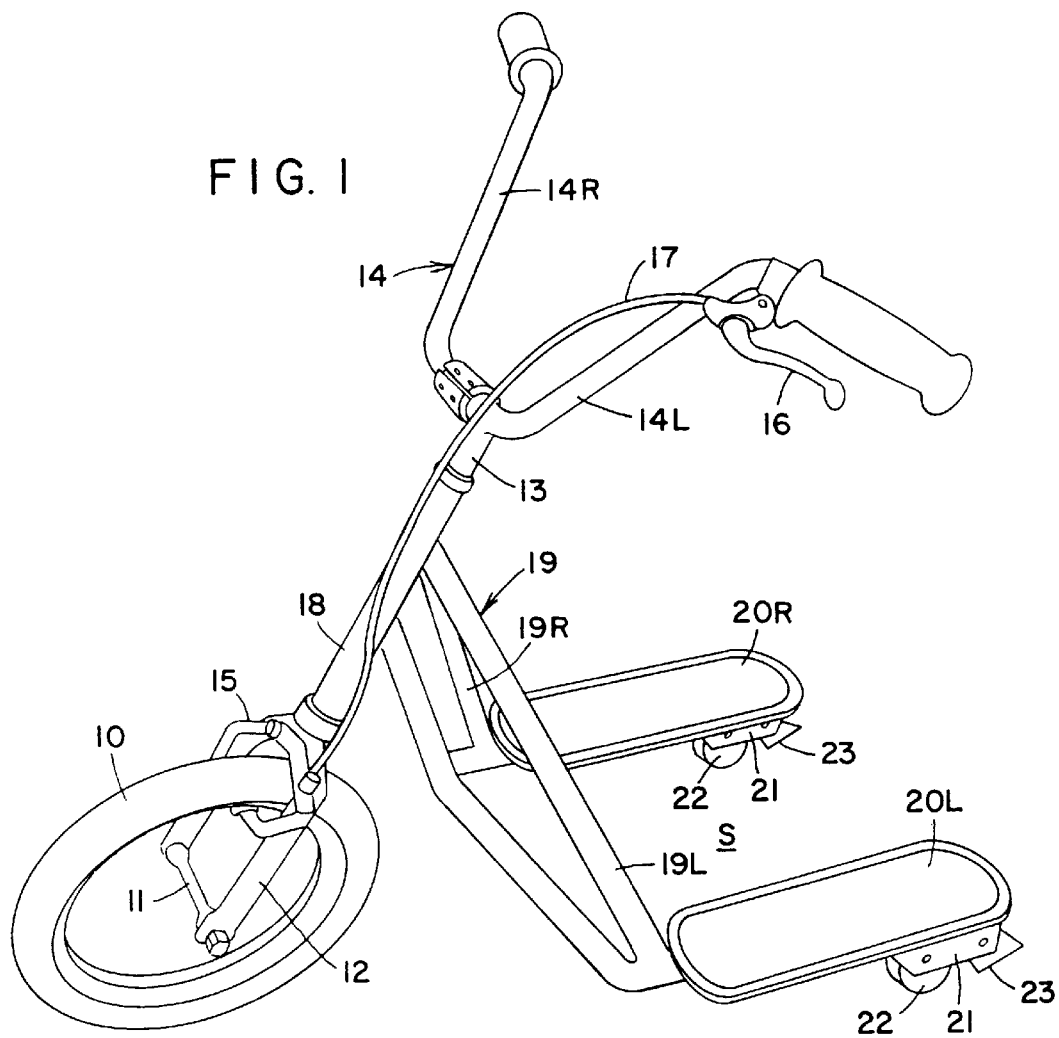
FIG. 1 is a perspective view of a dual-footboard scooter for road use in accordance with the invention.

Referring now to FIG. 1, there is shown a dual-footboard scooter in a tricycle format in accordance with the invention for road use, the scooter including a front wheel 10. Wheel 10 may be a conventional 10 to 16 inch tire-rimmed tricycle wheel mounted on an axle 11.

Coupled to axle 11 of front wheel 10 by a fork 12 is an upright steering post 13 whose upper end is joined to a steering handle 14 provided with right and left handle bars 14R and 14L. The rim of front wheel 10 is engageable by a clamp-type brake 15 which is controllable by a hand lever 16 mounted on the left hand bar 14L of the handle. Lever 16 is operatively coupled to brake 15 by a cable 17. Steering post 13 extends through a steering column 18, the post being rotatable within the column. The front wheel, the steering post, the steering column and the front wheel brake may be the same as those included in a standard tricycle and are therefore readily available.

Figure 2:
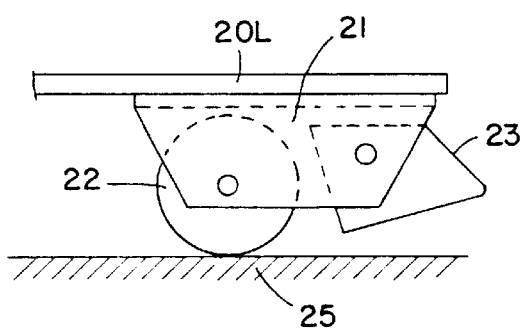
FIG. 2 shows the rear portion of one of the footboards on which is mounted a rear skate wheel behind which is a skid brake.

Welded to steering column 18 and extending rearwardly therefrom is a bifurcated rigid frame having right and left branches 19R and 19L. Attached to frame branch 19R is the front end of an elongated right footboard 20R, and attached to frame branch 19L is the front end of a left footboard 20L. Secured to the underside of each footboard, as best seen in FIG. 2, is a bearing bracket 21 which supports a skate wheel 22. Wheel 22 is preferably of the type used in roller skates, the wheel being molded of high strength polyurethane or other synthetic plastic material.

Figure 3:
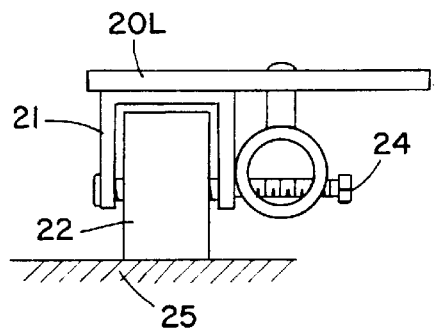
FIG. 3 illustrates the mounting for a rear skate wheel.

As best seen in FIG. 3, skate wheel 22 is mounted on a retractable axle 24 so that when the wheel is worn or damaged, it may then readily be replaced by a fresh wheel.

Also mounted on bracket 21 behind wheel 22 is a skid brake 23 which may be of the type found in in-line roller skates. The skid brake is preferably formed of rubber or a synthetic plastic material such as polyethylene have a high coefficient of sliding friction.

The two parallel footboards 10 and 11 are widely spaced from each other to define therebetween a free space S. Thus when a rider has one foot on either footboard he may then extend his other foot through space S to swing and engage the ground with a pushing motion to propel the scooter forward.

Scooter Operation

To operate the dual-footboard scooter, the rider when the scooter is coasting, grasps the handle with both hands and rests his right and left feet on footboards 20R and 20L. As the rider coasts he can steer by turning the front wheel.

In order to propel the scooter in the forward direction, the rider while resting one foot on either footboard, swings his other foot to make pushing contact with the road surface, this foot going into free space S between the footboards. Should the rider wish to slow down and arrest forward motion of the scooter, he has only to operate the hand controlled front wheel brake for this purpose. Because of the catamaran structure of the dual-footboard scooter, it is highly stable and will not tip to one side. Hence the scooter affords a measure of safety in this regard, even to an altogether in-experienced rider.

In normal operation, skid brakes 23 on the rear end of both footboards are raised above the road surface 25 as shown in FIG. 2, just as they would be in conventional in-line roller skates. Hence the rear skate wheels 22 are then free to turn.

Figure 4:
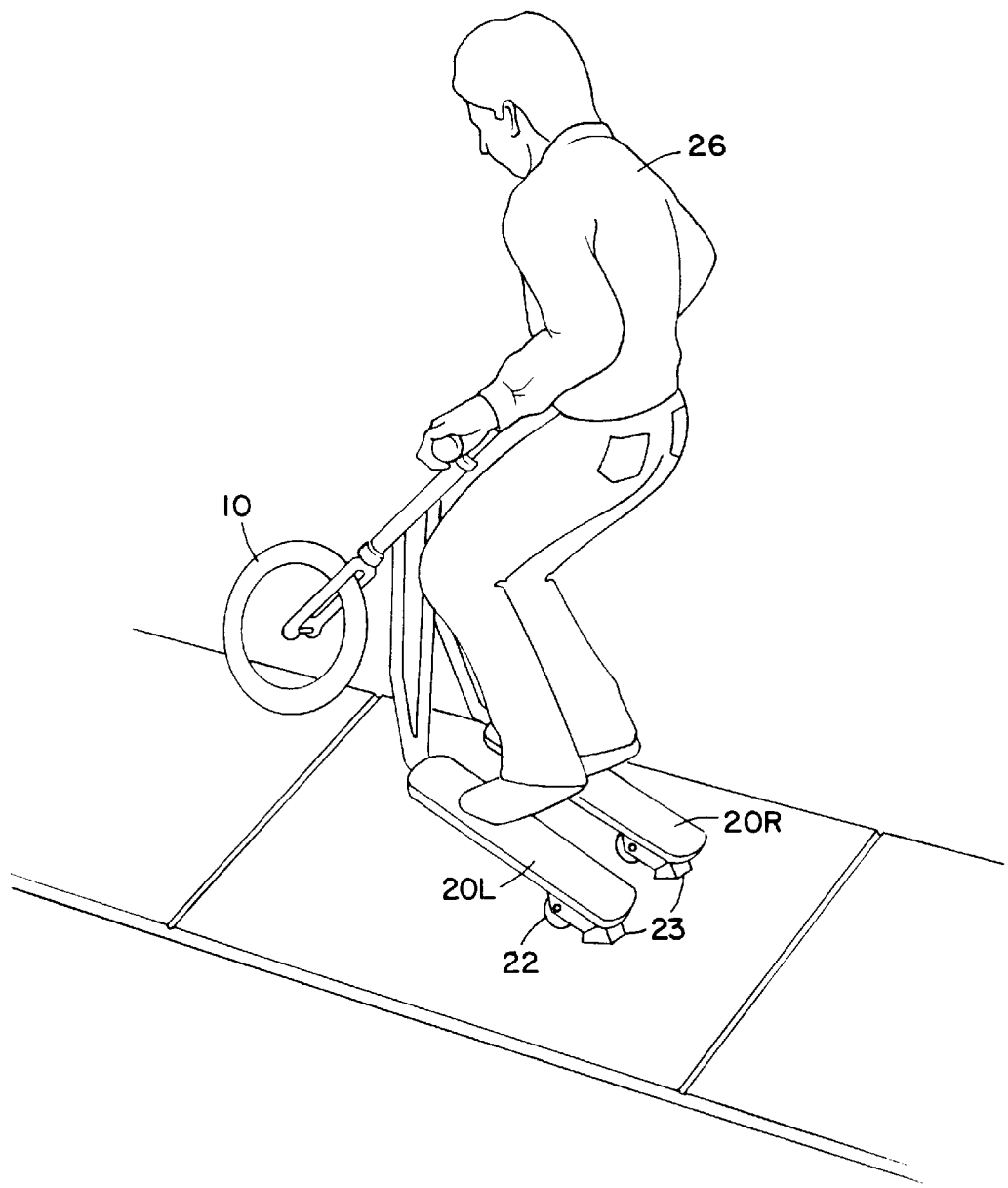
FIG. 4 shows a rider on the scooter when the scooter is upwardly tilted.

In the course of scooter travel, the scooter may be caused to jump, as when leaping over a step from a raised to a lower road surface, as shown in FIG. 4, which shows a rider 26 grasping the handle of the scooter. When the scooter jumps, footboards 20R and 20L are then tilted upwardly and front wheel 10 is then raised above the road surface. As a consequence, the scooter now seeks to swing backward about rear skate wheels 22, particularly since the rider now leans backward.

Figure 5:
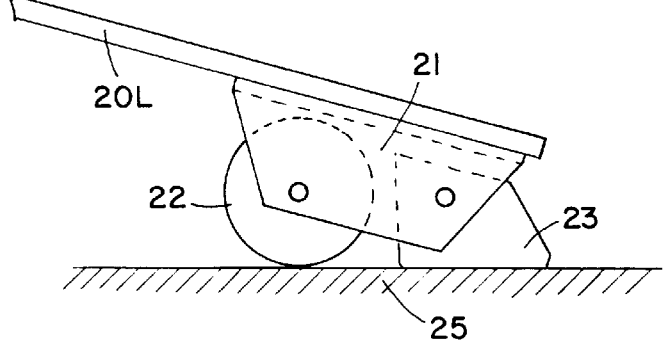
FIG. 5 illustrates the relation of a rear skate wheel to the ground when the footboard on which it is mounted is upwardly tilted.

However, the upward tilt of the footboards, as shown in FIG. 5, causes skid brakes 23 to engage and skid along ground surface 25 and thereby brake the rear wheels. This forces the scooter to swing forward and in doing so to return front wheel 10 to the ground. When this happens the skid brakes are again disengaged from the ground and the scooter is permitted to continue its forward travel.

Hence the rear skid brakes perform an important safety function, for they prevent the scooter from throwing off and possibly injuring the rider. In a vehicle in accordance with the invention, normal braking is effected by the front wheel brake, not by the rear skid brakes which only come into play momentarily when the scooter is upwardly tilted as a result of a maneuver executed by the rider, for only then do the skid brakes make brief contact with the ground.

Thus the skid brakes do not in the manner of an in-line roller skate effect a braking action but only serve to return the front wheel to the ground surface so that the scooter can continue to travel in the forward direction.

Off-Road Dual-Footboard Scooter I

The dual-footboard scooter shown in FIG. 1 is an on-road scooter, meaning that its wheels function best on a paved road substantially devoid of surface imperfections and disruptions. But if the small diameter roller skate rear wheels or tired front wheel of this scooter encounter a deep rut or pothole in the paved road or sidewalk, the child riding the scooter may lose control of the vehicle.

Figure 6:
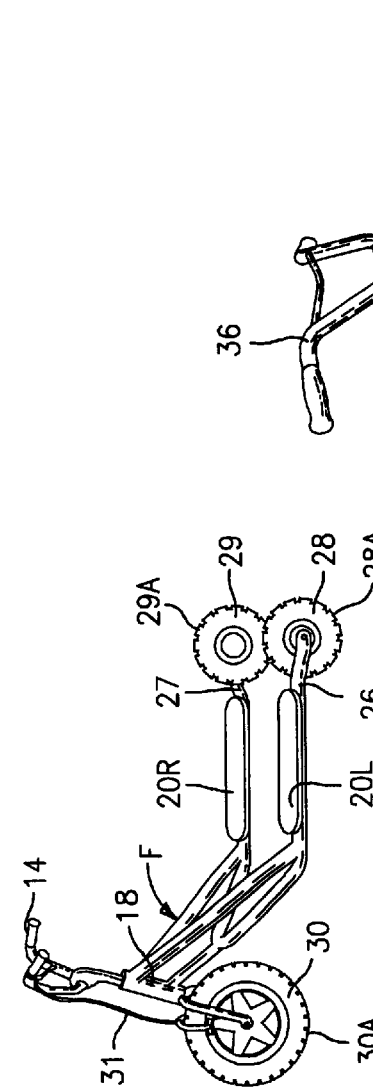
FIG. 6 shows a first embodiment of a dual-footboard scooter in accordance with the invention for off-road use.

The off-road scooter shown in FIG. 6 is adapted to operate efficiently under difficult off-road conditions, as well as under normal on-road conditions. Thus a child riding on this scooter is not confined to a paved road or a sidewalk in good condition, but he may veer off onto an unpaved road, a dirt path or a grassy field.

The scooter shown in FIG. 6 has a bifurcated frame F extending from steering column 18, the frame having parallel branches 26 and 27 on which are supported the left and right footboards 20L and 20R. These branches extend beyond the footboard to terminate in small-diameter rear wheels 28 and 29 whose axles extend inwardly from the offset ends of the branches so that wheels are within these ends.

A large-diameter front wheel 30 is coupled by a fork (as in FIG. 1) to a steering post extending through steering column 18 which is joined to handle bars 14. The rim of wheel 30 is engageable by a clamp-type brake controllable through a cable 31 by a lever mounted on the handlebar, as in FIG. 1.

Where the off-road scooter shown in FIG. 6 differs from the on-road scooter illustrated in FIG. 1 in that the wheels are provided with deep-tread tires which may be of solid or pneumatic construction formed of rubber or synthetic plastic material. Thus rear tires 28 and 29 are provided with deep-tread tires 28A and 29A, while the larger diameter front wheel 30 is provided with a deep-tread tire 30A.

These deep-tread tires afford good traction under difficult off-road conditions so that the dual-footboard scooter can be used more adventurously by its rider, and the child riding the scooter can veer off a paved road or sidewalk onto a dirt road or path, or a grassy field that a conventional scooter would have difficulty negotiating.

Off-Road Dual-Footboard Scooter II

The front wheel of a dual footboard scooter engages the ground at the apex of an isosceles triangle having two equal sides, the rear wheels engaging the ground at the ends of the base of the triangle. The stability of this scooter therefore depends on the length of the triangle base, the shorter the base the less stable the scooter.

Figure 7:
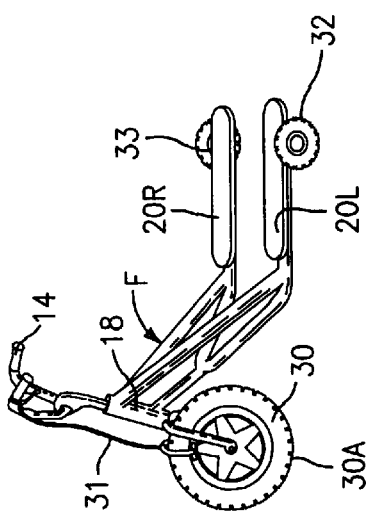
FIG. 7 shows a second embodiment of a dual footboard scooter for off-road use.

In order to enhance the stability of the scooter without significantly reducing its maneuverability, the off-road scooter shown in FIG. 7 is provided with outrigger rear wheels 32 and 33 having deep-tread tires. The rear wheels are outwardly displaced with respect to parallel footboards 20L and 20R, thereby extending the base of the triangle to provide a more stable scooter capable of efficient operation under all road conditions.

In practice, skid brakes (not shown) may be attached to the rear end of the footboard. The outrigger rear wheel arrangement shown in FIG. 7 may also be used with the scooter shown in FIG. 1.

Dual-Footboard Snow Scooter

For travelling or sliding over snow, use is often made of a pair of skis, each being a long, flat runner of plastic or metal attached to a foot of the skier. Also known for this purpose is a ski bob which is a vehicle for gliding downhill over snow. A ski bob consists of two skis, one behind the other on a metal frame. Steering handle bars are connected to the forward ski, with a low seat attached to the longer rear ski for the rider who wears on his feet small skis for balance.

Figure 8:
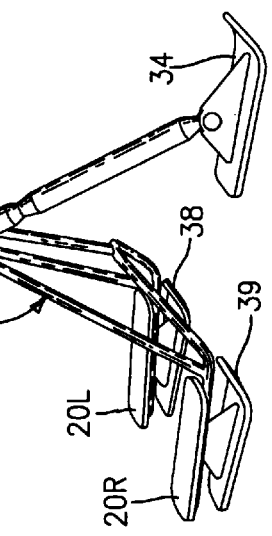
FIG. 8 shows a dual-footboard water scooter in accordance with the invention.

In the dual footboard snow scooter shown in FIG. 8, there is no need for the rider to wear small skis for balance, for the scooter which engages the snow surface with three skis in the configuration of a triangle is inherently balanced and stable.

The snow scooter is provided with a front ski 34 mounted at the end of a steering post extending through a steering column 35 to join handle bars 36. A bifurcated frame F defines parallel branches on which are supported a pair of rear skis 37 and 38. Mounted above rear skis 37 and 38 are parallel footboards 20L and 20R.

Thus on a level snow surface, the snow scooter shown in FIG. 8 may be pushed ahead by the rider who has one foot resting on a footboard and the other foot extending through the free space between the footboards to make pushing contact with the snow to propel the scooter forward.

But for gliding downhill over snow, the rider keeps both feet on the footboards and steers his way downhill.

In practice, the rear skis and the associated footboards may be hinged to the branches of the frame so that the rider standing on the footboard can angle the rear skis to slow down the downhill slide of the snow scooter.

Dual-Footboard Water Scooter

Figure 9:
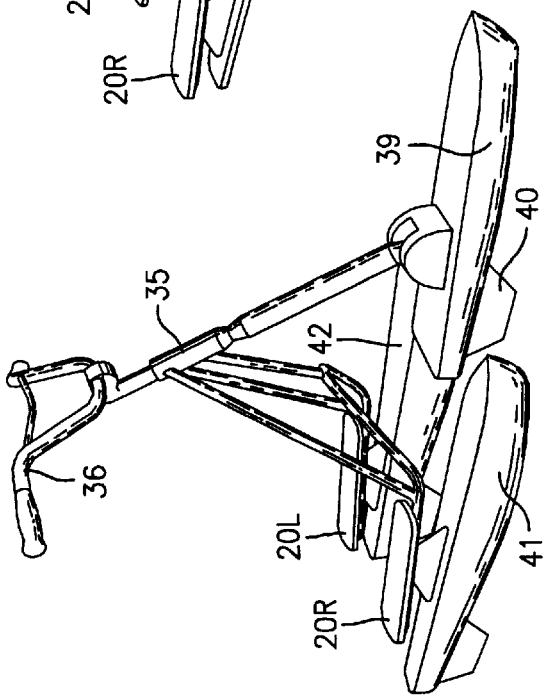
FIG. 9 shows a dual-footboard snow scooter in accordance with the invention.

In order to ride on water rather than on snow, the water scooter shown in FIG. 9 is essentially the same as the snow scooter shown in FIG. 8 except that instead of skis, the scooter is provided with a boat-shaped forward pontoon 39 having a rear fin 40, and a pair of boat-shaped rear pontoons 41 and 42, each provided with a rear fin. The fin 40 on forward pontoon 39 act as a rudder when this handlebar-controlled pontoon is steered by the rider.

The three pontoons which in practice may include inflatable bladders, has sufficient buoyancy to maintain afloat a child standing with both feet on the footboards 20R and 20L mounted above the rear pontoons.

In order to operate this water scooter in the manner of a road scooter, the child wears flippers, and as he stands with one flippered foot on one footboard, he then uses his other flippered foot in the water space between the footboards to propel the scooter. Or the water scooter may be towed behind a motor boat in the manner of water skis.

Convertible Dual-Footboard Scooter

A dual-footboard scooter in accordance with the invention is in a tricycle format in that it has a steerable front wheel and a pair of rear wheels. But a scooter cannot function as a tricycle for it lacks pedals to turn the front wheel, and a seat on which the rider sits as he operates the pedals with his feet.

Figure 10:
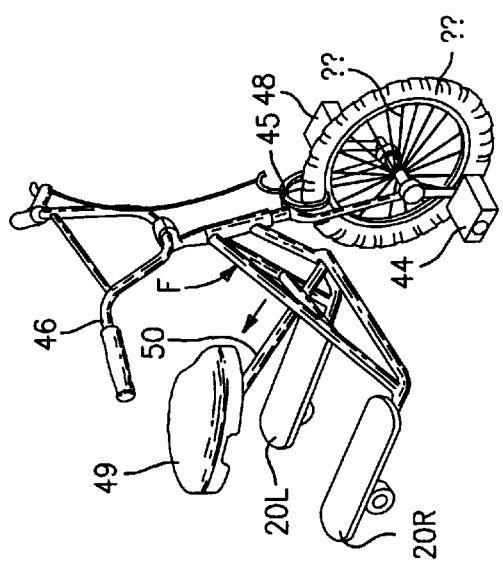
FIG. 10 shows a dual-footboard scooter that is convertible into a tricycle.

In the convertible dual-footboard scooter shown in FIG. 10 which is provided with a large diameter front wheel 43 having a deep-tread tire 44 and a brake 45 operated by a lever on a handlebar 46, the front wheel is provided with a pair of detachable foot pedals 47 and 48.

The coupling mechanism for attaching the pedals to the hub of the front wheel is preferably of the type which includes a pedal release button, making it easy to detach the pedals.

Also provided is a seat 49 mounted at the rear end of a strut 50 which is releasably coupled to the frame F of the vehicle, so that when not in use, the seat and strut therefor can be detached from the frame. When the pedals 47 and 48, the seat 49 and the strut 50 are decoupled from the vehicle, it then functions as a dual-footboard scooter in the manner described in connection with FIG. 1.

While there has been shown preferred embodiments of a dual-footboard in accordance with the invention, it is to be understood that many changes may be made therein without departing from the spirit of the invention.

I claim:

1. A foot-propelled dual footboard scooter in a tricycle format, said scooter comprising:
   a. a front wheel having an axle coupled to an upright steering post passing through a steering column to join a steering handle provided with a hand brake operatively coupled to the front wheel, whereby a rider of the scooter grasping the steering handle can steer and brake the scooter;
   b. a rigid frame attached to and extending rearwardly from the steering column;
   c. a pair of footboards supported on the frame adapted to accommodate a foot of the rider therebetween, to make pushing contact with a road surface, so as to propel the scooter, while the other foot of the rider rests on either of said footboards; and
   d. two rear wheels of relatively smaller diameter compared with said front wheel, one of said two rear wheels associated with and disposed below each of said pair of footboards, whereby the scooter normally runs on said front wheel and said two relatively smaller rear wheels, said frame being bifurcated into separate branches rearward of said front wheel and on which the footboards are supported, at least one of said front wheel and said rear wheels being provided with a deep-tread tire whereby the scooter is ridable under off-road conditions, and wherein an uninterrupted free space is defined, said free space extending horizontally between said branches, rearwardly to said footboards and therebetween, vertically to the height of said handlebars and adapted to extend to the road surface.

2. A scooter as set forth in claim 1, in which said tire is a solid tire.

3. A scooter as set forth in claim 1, in which said tire is an inflatable pneumatic tire.

4. A scooter as set forth in claim 1, in which the hand brake is engageable with a rim of the front wheel and the handle is provided with a lever coupled by a cable to the hand brake whereby when the lever is operated, the hand brake engages the front wheel.

5. A scooter as set forth in claim 1, in which said rear wheel is attached to an end of a respective branch of the frame.

6. A scooter as set forth in claim 1, in which said rear wheel is attached by an outrigger structure to a respective branch of the frame so that the rear wheel is outwardly displaced from the footboard supported on the branch.

7. A scooter as set forth in claim 1, further including a skid brake behind the rear wheel adapted to engage the road surface only when the footboard is upwardly inclined.

* * * * *